United States Patent
Ortiz et al.

[11] Patent Number: 5,905,208
[45] Date of Patent: *May 18, 1999

[54] SYSTEM AND METHOD MEASURING FLUID FLOW IN A CONDUIT

[75] Inventors: Marcos German Ortiz, Idaho Falls, Id.; Terrel G. Kidd, Blackfoot, Id.

[73] Assignee: Lockheed Martin Idhao Technologies Company, Idaho Falls, Id.

[ * ] Notice: This patent is subject to a terminal disclaimer.

[21] Appl. No.: 08/724,985

[22] Filed: Oct. 3, 1996

Related U.S. Application Data

[63] Continuation-in-part of application No. PCT/US96/01521, Feb. 2, 1996, which is a continuation-in-part of application No. 08/383,343, Feb. 3, 1995.

[51] Int. Cl.$^6$ ........................................... G01F 1/34
[52] U.S. Cl. ..................... 73/861.42; 73/861.72
[58] Field of Search ........................ 73/861.42, 861.64, 73/861.72, 30.01, 30.02, 32, 438

[56] References Cited

U.S. PATENT DOCUMENTS

| | | |
|---|---|---|
| 970,965 | 9/1910 | Speed . |
| 1,181,490 | 5/1916 | Levin . |
| 1,905,558 | 4/1933 | Foote . |
| 1,963,011 | 6/1934 | Albersheim et al. . |
| 3,067,611 | 12/1962 | Bowers et al. . |
| 3,777,549 | 12/1973 | Lodge . |
| 3,855,545 | 12/1974 | Homolka ................ 73/30.02 |
| 4,074,573 | 2/1978 | Nordhofen . |
| 4,144,754 | 3/1979 | Pitts, Jr. et al. .............. 73/861.69 X |
| 4,197,740 | 4/1980 | McNabney ............... 73/861.66 |
| 4,277,832 | 7/1981 | Wong . |
| 4,581,934 | 4/1986 | Holzl ......................... 73/438 |
| 4,625,548 | 12/1986 | Charter ................... 73/438 X |
| 4,625,553 | 12/1986 | Charter ..................... 73/438 |
| 4,856,344 | 8/1989 | Hunt . |
| 5,323,661 | 6/1994 | Cheng .................. 73/861.42 X |
| 5,337,603 | 8/1994 | McFarland . |
| 5,400,657 | 3/1995 | Kolpak et al. . |
| 5,591,922 | 1/1997 | Segeral et al. ............. 73/861.42 X |
| 5,597,020 | 1/1997 | Miller et al. ............... 73/861.02 X |

FOREIGN PATENT DOCUMENTS

| | | |
|---|---|---|
| 2565344 | 12/1985 | France . |
| 2828129 | 3/1980 | Germany ............. 73/861.69 |
| 02-38817 | 2/1990 | Japan . |
| 432416 | 7/1935 | United Kingdom . |

*Primary Examiner*—George Dombroske
*Assistant Examiner*—Paul D. Amrozowicz
*Attorney, Agent, or Firm*—Thorpe North & Western

[57] ABSTRACT

A system for measuring fluid mass flow in a conduit in which there exists a pressure differential in the fluid between at least two spaced-apart locations in the conduit. The system includes a first pressure transducer disposed in the side of the conduit at a first location for measuring pressure of fluid at that location, a second or more pressure transducers disposed in the side of the conduit at a second location, for making multiple measurements of pressure of fluid in the conduit at that location, and a computer for computing the average pressure of the multiple measurements at the second location and for computing flow rate of fluid in the conduit from the pressure measurement by the first pressure transducer and from the average pressure calculation of the multiple measurements.

3 Claims, 2 Drawing Sheets

SYSTEM AND METHOD MEASURING FLUID FLOW IN A CONDUIT

This is a continuation-in-part of PCT/US96/01521 filed Feb. 2, 1996, which is a continuation-in-part of application Ser. No. 08/383,343, filed Feb. 3, 1995.

CONTRACTUAL ORIGIN OF THE INVENTION

The United States Government has rights in this invention pursuant to Contract No. DE-AC07-94ID13223 between Lockheed Martin Idaho Technologies Company and The United States Department of Energy.

BACKGROUND

1. Field of the Invention

This invention relates to apparatus and methods for measuring mass flow in a conduit, such as water flow in an irrigation pipe, and relates more specifically to such apparatus and methods which are substantially non-obstructing.

2. Background Art

The desire to measure flow in a conduit has a long history dating back to the time of Caesar and the measurement of the flow of water to householders. More recent developments have led to a variety of applications for devices measuring flow in a conduit.

The need to measure fluid flow in a conduit may arise from a desire to control, track, or adjust the amount of fluid being delivered through the conduit. Naturally, measuring the flow in a conduit is useful in a number of applications. One such application is measuring the flow of water through a sprinkler pipe, particularly in agricultural irrigation applications. This is desirable for several reasons, including the desire to track and control the amount of water delivered to a given tract of land and the time over which the water is delivered, so that adequate irrigation for the crop being grown is provided. Additionally, in regions where irrigation is needed for growing crops, water is usually a precious commodity and, therefore, the efficient use of water is highly desirable. For such reasons, irrigation systems require the ability to monitor the delivery of water and measure and control the flow rate.

A number of devices for measuring flow rate exist for various applications. The size of the conduit being used, accuracy, cost, and other factors all play a role in determining what type of measuring device will be used for a specific application. One of the most widely used type of device is the so-called differential pressure producing flowmeter. The principle on which this type of device operates is that when the flow in a conduit is contracted (or squeezed), kinetic energy increases at the expense of available potential energy. A feature, therefore, in existing devices for measuring flow in this fashion is to contract the flow through the conduit. Typical systems for reducing the flow include installing a section of pipe which tapers to a significantly smaller diameter, inserting a blockage in the conduit, or creating some other obstruction.

As will be appreciated, contracting the flow of water through a sprinkler pipe is undesirable for a number of reasons. For example, irrigation water often contains debris which can become lodged in a small diameter pipe or caught on an obstruction. This can result in plugging of the pipe, requiring time, energy, and expense to unplug or otherwise repair it. In addition, serious incidents of plugging or damage may jeopardize crops which go unwatered during the time spent unplugging or repairing the pipe. This is particularly true during critical periods in a crop's growing cycle.

An additional problem with differential pressure producing devices currently available is that there is often significant retrofitting required to incorporate them into the system where flow is being measured. For example, in the case of devices which use a gradual reduction in the diameter of the conduit, a relatively long section of conduit must be removed and replaced with a tapering conduit section.

Yet another problem with current devices for measuring flow in a conduit is that variations in temperature and humidity can adversely affect their operability and accuracy. This is particularly true if the variations in temperature or humidity are pronounced. Unfortunately, these are often exactly the types of conditions encountered in agricultural irrigation applications in arid regions. Arid regions can experience wide variations in temperature with hot days and cold nights. In addition, the irrigation systems themselves may cause variations in humidity.

Another prior art approach to measuring flow rate is the so-called elbow flow meter in which a curved section of pipe (the elbow) in the fluid delivery system is fitted with pressure sensors to measure pressure differential in the elbow. In order to measure the flow accurately, the sensors must be precisely placed in both the outer and inner circumferential walls of the elbow, in the same radial plane, and then must be calibrated. (See J. W. Murdock al., "Performance Characteristics of Elbow Flow Meters," Trans. of the ASME, September 1964.)

It would be an advantage in the field of flow measurement to provide a differential pressure measuring device and method which would be relatively simple to install, substantially accurate through differing temperature and humidity ranges, and substantially non-obstructing such that the likelihood of plugging of the conduit in the area of the device is lessened. It would also be an advantage to provide such a device and method capable of measuring backflow and, if desired, taking action based on the occurrence of backflow. Further, for multi-phase flow measurement, it would be advantageous to track density and density changes in the fluid.

BRIEF SUMMARY AND OBJECTS OF THE INVENTION

The present invention is an apparatus and method for measuring the flow of fluid through a conduit in which a pressure differential is developed between at least two spaced-apart locations in the conduit. The measurement apparatus includes pressure sensors for detecting pressure differentials in the fluid flowing in the conduit and a device for calculating the flow rate through the conduit from the pressure measurements.

In a preferred embodiment, a pressure transducer is disposed in the conduit at a first of the locations, and one or more pressure transducers are disposed in the conduit at the second of the locations, for making multiple measurements of pressure of fluid in the conduit at that location. A calculating device is coupled to the pressure transducers to first compute the average pressure of the multiple measurements made at the second location, and then for computing the flow rate of fluid in the conduit from the fluid pressure measurement by the pressure transducer at the first location, from the average pressure calculation, and from fixed parameters of the conduit.

The multiple measurements of pressure made at the second location may be done either by a plurality of pressure transducers or by one pressure transducer taking successive multiple measurements.

For multi-phase fluid flow through a conduit (flow of two or more materials of differing density), an average density measurement is taken by measuring the vertical pressure differential of the fluid between two pressure transducers disposed in the conduit, with one transducer at a higher elevation than the other but generally in the same vertical slice of the conduit. This pressure differential measurement may then be used to calculate fluid density which, in turn, is used to calculate fluid flow rate.

In accordance with one aspect of the invention, the pressure transducers (or fluid pressure taps) are disposed generally at the inside surface of the conduit so as to be non-intrusive into the fluid flow. In this manner, the likelihood of debris in the fluid getting caught on the pressure transducers or taps is minimized if not eliminated.

In the above embodiments, a microprocessor or computer may be employed to average the pressure measurements at the second location, calculate density of the fluid, and calculate flow rate.

Accordingly, it is a primary object of the present invention to provide apparatus for measuring fluid flow in a conduit, where such apparatus is easy to install and generally non-obstructing.

Another object of the invention is to provide a rugged apparatus which is substantially immune to fluctuations in temperature and humidity, and to noise and turbulence.

BRIEF DESCRIPTION OF THE DRAWING

In order to more fully understand the manner in which the aboverecited and other advantages and objects of the present invention are obtained, a more particular description of the invention briefly described above will be rendered by reference to the appended drawings. Understanding that the drawings depict only typical embodiments of the invention and are, therefore, not to be considered as limiting of its scope, the invention will be described with additional specificity and detail through the use of the accompanying drawings in which.

DETAILED DESCRIPTION OF THE INVENTION

Figure 1:
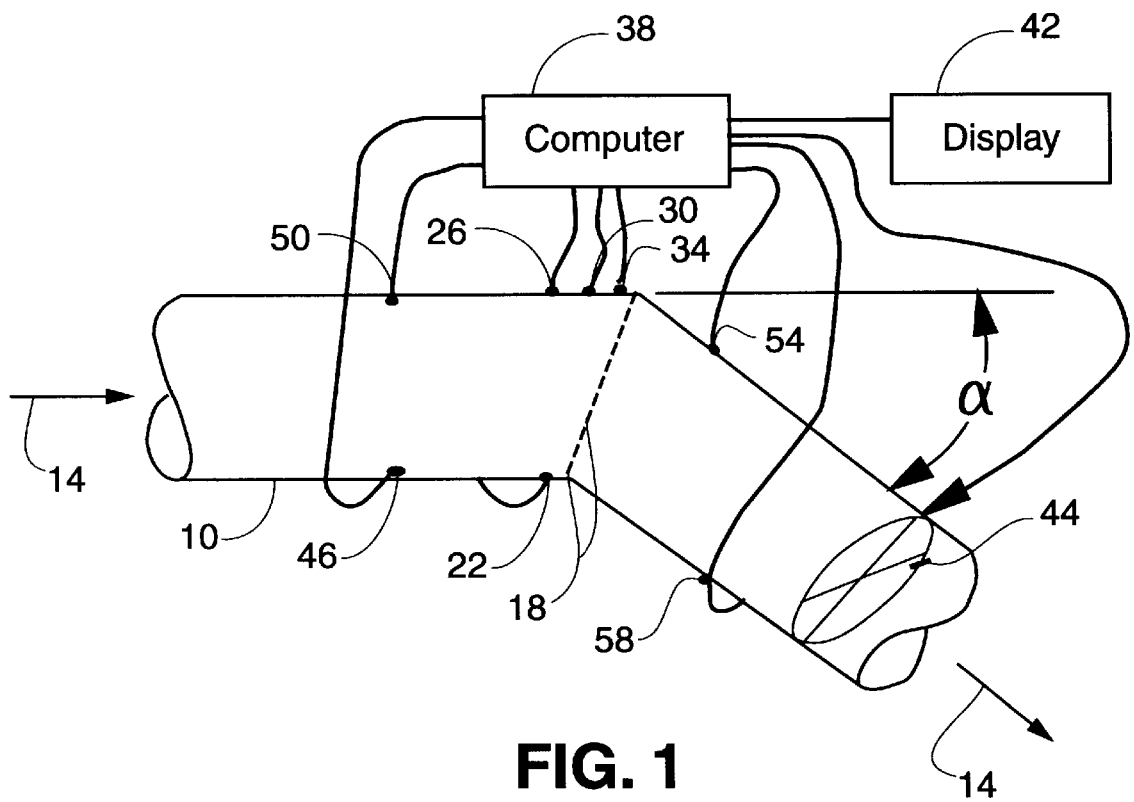
FIG. 1 shows a side, elevational view of apparatus for measuring fluid flow in a conduit having an abrupt bend, in accordance with the principles of the present invention.

Referring to FIG. 1, there is shown a fragmented, side, elevational view of a conduit 10 for carrying a fluid in the direction indicated by arrows 14, and which has an abrupt bend 18 for creating a pressure differential. The fluid flow measurement made by the present invention utilizes the pressure differential in the fluid created by the fluid flowing around the bend 18.

The apparatus for measuring flow in the conduit 10 includes a pressure transducer 22 (or a fluid pressure tap) disposed in the wall of the conduit 10 to contact the fluid and located near the location of the bend 18, upstream thereof, or right at the bend. Also included are three pressure transducers 26, 30 and 34 disposed in the wall of the conduit 10 and located generally diagonally opposite transducer 22 and spaced in a line upstream but near the bend 18. An exemplary transducer which could be utilized in the present invention is the Omega Low Pressure Differential Transducer PX 150/154 series.

The pressure transducers 22, 26, 30 and 34 provide for measuring fluid pressure differential on opposite sides of the conduit, and the use of the three transducers 26, 30 and 34 allow for averaging the fluid pressure just prior to the bend 18 to eliminate the effects of turbulence, noise or other error which might be introduced. Two or more transducers allow for averaging the fluid pressure measurement at that location. Two or more transducers could also be used in place of transducer 22, to average the fluid pressure measured at the inside of the bend 18. Also, multiple measurements by a single transducer over a short period of time, which are then averaged, could be employed in place of or in addition to using multiple transducers. Finally, placing transducers 26, 30 and 34 in line with each other, at generally the same elevation, eliminates the need for compensation of the fluid flow measuring apparatus to account for elevation differences or pipe-section differences. Use of multiple transducers (or taps), or multiple measurements, is useful for averaging out noise in any pressure differential flow measuring system.

Transducers may be placed in the conduit 10 by tapping the conduit and inserting the preferred pressure transducer or pressure sensing device. The transducers may be held in place by threaded engagement with the conduit, adhesives, or other conventional mechanism. Naturally, maintaining the integrity of the seal between the transducers and the conduit is important to avoid leaking around the transducers or dislodgement thereof. A durable seal can be obtained by a variety of installation techniques. For example, if the transducers and the conduit are threadingly engaged, a teflon tape may be used on the threads to prevent leakage. As another example, a small portion of the conduit could be removed and a portion of conduit, with transducers installed in the walls thereof, could replace the removed portion. As will be appreciated, most techniques for creating a waterproof seal in a pressurized environment will also be applicable to the present invention.

Although pressure transducers are illustrated in the drawing, and these transducers would detect fluid pressure at the location of their installation and develop a signal for transmission to a computer 38 or other calculation device, it should be understood that fluid pressure taps could be used in place of the transducers for communicating fluid from the conduit 10 to a common pressure measuring device. Thus, when referring to a pressure transducer or pressure sensor, this should be understood to include a pressure tap.

An alternative to placing the pressure transducers 22, 26, 30 and 34 upstream of the bend 18 is to place them downstream of the bend but still in close proximity thereto. With this configuration, it is advantageous to place the multiple pressure transducers within a distance of the bend of about one third the diameter of the conduit 10 upstream of the bend. Again, using multiple pressure transducers on the opposite side of pressure transducer 22 allows for averaging out the noise, turbulence air, etc.

In a further alternative, pressure transducer 22 could be placed upstream of the bend 18, on the same side as pressure transducers 26, 30 and 34, with the latter transducers being positioned downstream of the bend.

Signals indicating the pressure detected by pressure transducers 22, 26, 30 and 34 are supplied to the computer 38 for processing and computation of a flow rate. The computer 38 could be the currently available microprocessor such as any eight-bit commercial CPU chip. The flow of fluid through the conduit 10 can be calculated from the signals received from the pressure transducers and from information preprogrammed in the computer representing certain fixed parameters of the conduit 10, according to the formula:

$$m_f = \beta \left( \frac{D^2 \pi}{4 \sin\alpha} \right) \sqrt{\rho} \sqrt{\Delta P}$$

where $m_f$ is the mass flow in kilograms per second, $\beta$ is a proportionality constant determined by the pressure profile distribution over the surface of the bend, i.e., it relates the point measurement to the overall pressure profile, and is determined empirically (experimentally) for particular size conduits and angles $\alpha$, D is the diameter of the conduit in meters, $\rho$ is the fluid density in kilograms per cubic meter, $\alpha$ is the angle of the change of direction of the conduit as indicated in FIG. 1, and $\Delta P$ is the pressure difference (in Pascal s) between pressure transducer 22 and pressure transducers 26, 30 and 34. The values of B, D, $\rho$ (for a single phase fluid or a fluid of invariant density) and $\alpha$, of course, would be supplied to the computer 38 to enable calculation of the mass flow using the above formula.

In agricultural irrigation applications, a typical sprinkler conduit for delivering irrigation water would be a four inch schedule 40 pipe. In such a case, for an angle $\alpha$ of about 45°, the coefficient of $$\sqrt{\Delta P}$$

would be 0.3665647 so that mass flow mf would equal 0.3665647

$$\sqrt{\Delta P}$$

for water.

It will be appreciated that a range of values for the variables in the above equation can be imagined based on differing fluids being delivered, different pipe sizes, and different bend angles.

Calculation of mass flow by the computer 38 could simply be displayed on a display unit 42 to enable a user to make manual adjustments in the system, if so desired, or the computer 38 could automatically effectuate controls in the system, for example, by opening or closing valves disposed in the conduit 10, such as valve 44. In agricultural irrigation systems, monitoring the flow rates could be used to control the amount of water delivered to a field, to shut off the system when delivery was completed or a malfunction occurs, or for various other control functions.

Although the discussion above related to measurement of flow of a single phase fluid such as water in an agricultural irrigation system, it is contemplated that the present invention will have application in other areas. For example, the invention lends itself to the measurement of mixtures and fluids containing impurities such as the flow of a slurry, for example a coal slurry, through a pipe, or multi-phase mixtures such as oil, water, gas and sand. Other examples would include measurement of the flow of municipal waste water and measurement of two-phase flow in a power plant. Clearly, there are a variety of applications of multi-phase fluid flow with which the present invention might be utilized.

If the fluid flowing in the conduit 10 is a multi-phase fluid, then the fluid density would not be known at any given time or any given location in the conduit. In this case, it would be necessary to calculate the density for inclusion in the computation by the computer 38, as indicated in the above formula. Pressure transducers 46 and 50, with the pressure transducer 50 being disposed elevationally above pressure transducer 46 in the conduit 10, may be used to calculate fluid density. The formula for doing this is:

$$\rho = \frac{\Delta P}{gH}$$

where g is the gravitational constant, H is the elevational distance in meters of the pressure transducer 50 above the pressure transducer 46, and $\Delta P$ is the pressure difference between pressure transducers 46 and 50.

The pressure transducers for use in calculating fluid density may be located either upstream or downstream of the bend 18 but there needs to be maintained an elevational difference between the two transducers to make the calculation. An alternative pair of pressure transducers 54 and 58 are shown connected by dotted line to the computer 38. Note that the transducer 54 is not positioned diametrically opposite but rather is positioned vertically above the transducer 58. It is not necessary that the uppermost transducer be directly above the lowermost, but only that it be at an elevation above that of the lowermost transducer. Thus, transducer 50 (or transducer 54) could be located in the side of the conduit 10 but still elevationally above transducer 46 (or transducer 58). Also, pressure transducers 22 and 26 might be used for making the density measurement but may not be as accurate due to their proximity to the bend 18.

Figure 2:
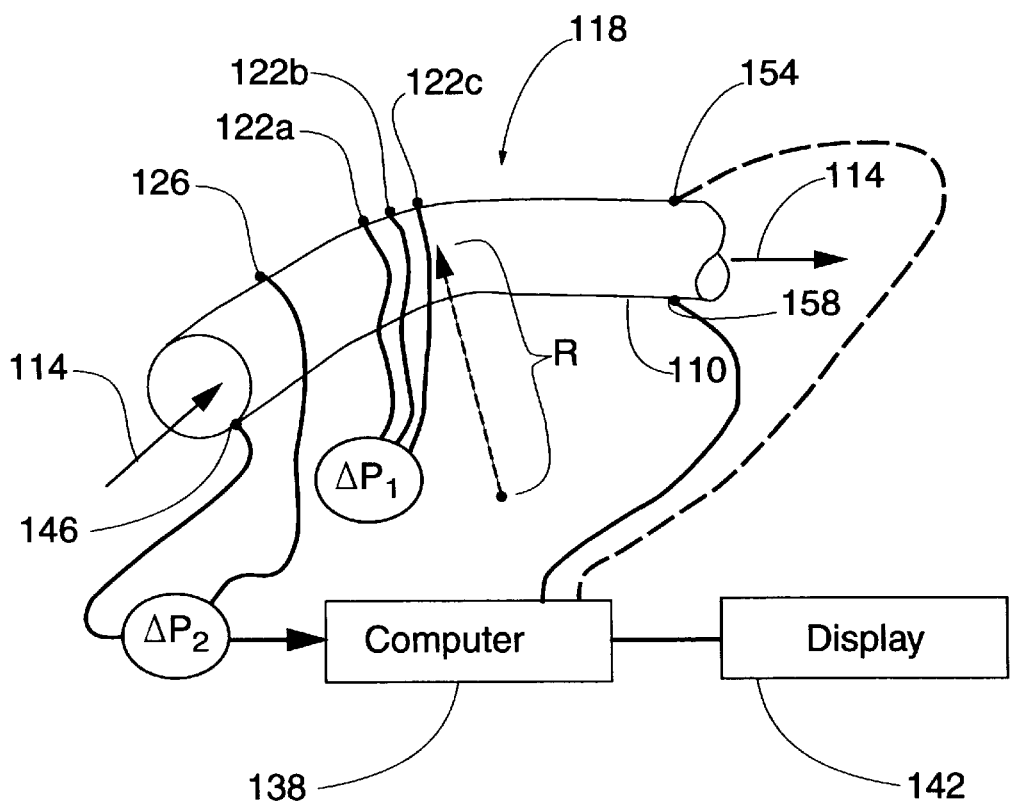
FIG. 2 shows a side, elevational view of apparatus for measuring fluid flow in a conduit having a gradual bend or curve, in accordance with the principles of the present invention.

Referring now to FIG. 2, there is shown a fragmented, perspective view of another embodiment of the invention, including a conduit 110 for carrying a fluid in the direction indicated by arrows 114, and which has a gradual bend or curve 118 for producing a pressure differential. Here, the bend or arc in the conduit 110 is horizontal, but the present invention is suitable for measuring fluid flow in a conduit with a gradual bend or arc directed upwardly, downwardly or in any direction. The fluid flow measurement made by the present invention utilizes the pressure differential in the fluid created by the fluid flowing around the arc 118.

The apparatus for measuring flow in the conduit 110 includes pressure transducers 122a, 122b and 122c (or fluid pressure taps) disposed in the wall of the conduit 110 to contact the fluid and located on the outside of the arc 118. Also included is a pressure transducer 126 disposed in the wall of the conduit 110 and located generally on the same side as transducers 122a, 122b and 122c, and in line therewith, but spaced upstream of the arc 118 in a straight section of the conduit.

The pressure transducers 122a, 122b, 122c and 126 provide for measuring fluid pressure differential on the same side of the conduit. Pressure transducer 126, however, could be located on the straight section of the conduit 110 other than on the same side as and in line with transducers 122a, 122b and 122c, and function to measure fluid flow. However, if the transducers 122a, 122b, 122c and 126 are at different elevational levels, then a slight pressure measurement bias is introduced due to the elevation difference, requiring compensation. Use of the three transducers 122a, 122b and 122c allows for averaging the fluid pressure in the arc 118 to eliminate the effects of turbulence, noise or other error which might be introduced as mentioned for the FIG. 1 embodiment.

An alternative to placing the pressure transducer 126 upstream of the arc 118 is to place it downstream of the arc, along a straight section of the conduit 110.

Signals indicating the pressure detected by pressure transducers 122a, 122b, 122c and 126 are supplied to the computer 138 for processing and computation of a flow rate. The flow of fluid through the conduit 110 can be calculated from the signals received from the pressure transducers and from information preprogrammed in the computer representing certain fixed parameters of the conduit 110, according to the formula:

$$mf = \left(\frac{\pi D}{4}\right)^{\frac{3}{2}} \sqrt{R\rho} \cdot \sqrt{\Delta P_1}$$

where mf is the mass flow in kilograms per second, R is the radius of curvature of the arc 118, D is the diameter of the conduit in meters, $\rho$ is the fluid density in kilograms per cubic meter, and $\Delta P$ is the pressure difference between pressure transducers 122a, 122b, 122c and pressure transducer 126. The values of R, D and $\rho$ (for a single phase fluid or a fluid of invariant density), would be supplied to the computer 138 to enable calculation of the mass flow using the above formula.

If the fluid flowing in the conduit 110 is a multi-phase fluid, then the fluid density would not be known at any given time or any given location in the conduit, and it would be necessary to calculate the density for inclusion in the computation by the computer 138, as with FIG. 1 embodiment. Pressure transducers 146 and 126, with the pressure transducer 126 being disposed elevationally above pressure transducer 146 in the conduit 110, may be used to calculate fluid density. These transducers may be located either upstream or downstream of the arc 118 but there needs to be maintained an elevational difference between the two transducers to make the calculation. (An alternative pair of pressure transducers 154 and 158 are shown connected by dotted line to the computer 138.) Note that pressure transducer 126 is used for making a pressure measurement for both the calculation of density and then the calculation of mass flow.

Figure 3:
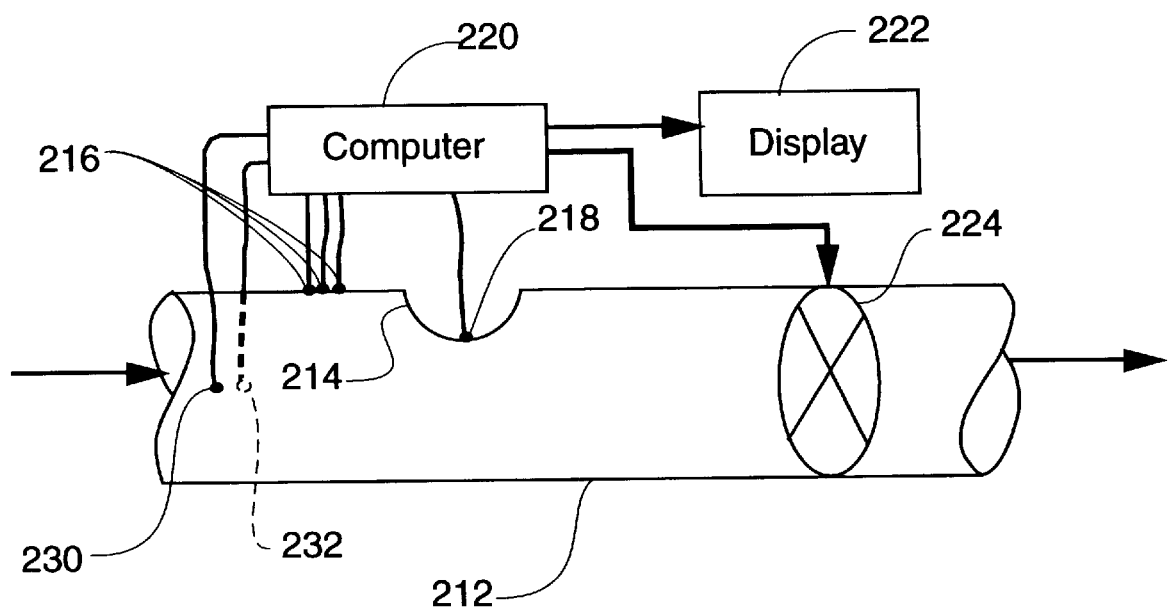
FIG. 3 shows a top, cross-sectional view of another embodiment of the present invention utilizing a rounded cylindrical half protrusion for developing a pressure differential in a conduit for measuring fluid flow.

Referring now to the embodiment in FIG. 3 which shows a top view of a rounded cylindrical half protrusion 214 in conduit 212, for producing a pressure differential, is graphically illustrated. As shown, first pressure transducers (or pressure taps) 216 are positioned upstream from protrusion 214. A second pressure transducer (or pressure tap) 218 is disposed upon protrusion 214, and preferably at the point along protrusion 214 at the midpoint of the arc of the protrusion, i.e., to the point at which protrusion 214 protrudes into conduit 212 to the greatest extent.

Upstream pressure transducers 216 and protrusion pressure transducer 218 are preferable disposed on the same side of conduit 212. In addition, upstream pressure transducers 216 and protrusion pressure transducer 218 are preferably substantially in line with one another, along a horizontal bearing in the conduit. As noted before, by placing the pressure transducers substantially in line with one another on a horizontal plane, measurement bias can generally be reduced or eliminated. Additionally, the need for accessibility to conduit 212 is reduced since only one side of conduit 212 need be available to service either pressure transducer. The measurements of pressure transducers 216 are averaged as discussed before.

The precise placement of the pressure transducers may vary somewhat while maintaining good results. Care should be taken, however, to attempt to place pressure sensor 218 as nearly as possible at the mid-point of the arc of protrusion 214. Also, the protrusion could have a variety of cross-sectional shapes including quarter cylindrical elliptical, etc.

Once the pressure transducers are positioned, the flow of fluid material through the conduit can be calculated as follows:

$$mf = A_1 \sqrt{\frac{2\Delta P \rho}{\left(\frac{A_1}{A_2}\right)^2 - 1}}$$

where:

mf=mass flow in kilograms per seconds;

$A_1$=the cross-sectional area of the conduit at pressure sensor 216, in square meters;

$A_2$=the cross-sectional area of the conduit at pressure sensor 218, in square meters;

$\Delta P$=the pressure difference in Pascals between pressure transducers 216 and pressure transducer 218; and $\rho$=the fluid density of the fluid flowing in the conduit in kilograms per cubic meter.

As will also be appreciated, additional transducers may be employed if desired. Once the transducers are positioned, the flow can be calculated using the formula above, adjusted to correspond to the configuration of transducers utilized.

Again, if the density of the fluid varies, then a density calculation for the fluid may be made using pressure transducers 230 and 232 which are positioned respectively on the top and bottom of the conduit 212 in general vertical alignment.

Computer 220 performs the flow calculation based on preprogrammed information for the constants associated with a given conduit configuration. Computer 220 can then display on a display unit 222 the flow rate measured. Additionally, if desired, computer 220 may generate control signals which can be transmitted to control a valve 224 or other controllable elements or actuators in the conduit system. Other valves would, advantageously, be placed along conduit 212 at various opportune locations. By opening, closing, or adjusting these valves, the amount of fluid delivered can be controlled.

As depicted, protrusion 214 is less intrusive than other systems which require that the entire circumference of the pipe be contracted. This reduces or eliminates problems of blockage or plugging by reducing the probability of debris lodging in the constricted area of the pipe. The rounding of protrusion 214 also aids in this area by reducing or eliminating the sharply angled surfaces on which debris or other material can find purchase to stick and hold.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

We claim:

1. A method for measuring fluid flow in a conduit having an abrupt bend in which there is a pressure differential between two locations in the conduit, the method comprising the steps of:

(a) positioning a first pressure transducer in the side of the conduit at a first of the two locations, to measure pressure of fluid in the conduit;

(b) positioning two or more second pressure transducers at a second of the two locations, to carry out a plurality of pressure measurements of fluid in the conduit;

(c) a computer computing the average pressure from the plurality of pressure measurements, and (d) a computer computing flow rate of fluid in the conduit in accordance with the formula, $$m_f = \beta \left( \frac{D^2 \sqrt{\rho\pi}}{4\sin\alpha} \right) \cdot \sqrt{\Delta P}$$

where mf is the flow rate in kilograms per second, B is a proportionality constant, D is the diameter of the conduit in meters, $\rho$ is the fluid density in kilograms per cubic meter, $\alpha$ is the angle of the change of direction of the conduit at the bend, and $\Delta P$ is the pressure difference between the first pressure transducer and the average pressure calculation.

2. A method as in claim 1 further comprising the steps of
(e) positioning a third pressure transducer in a side of the conduit to measure pressure,
(f) positioning a fourth pressure transducer in the conduit, at an elevation above that of the third pressure transducer, to measure pressure, and wherein said computing step further comprises
(g) computing the density $\rho$ of fluid flowing in the conduit in accordance with the formula $$\rho = \frac{\Delta P_2}{gH}$$

where g is the gravitational constant, H is the elevational distance in meters of the fourth pressure transducer above the third pressure transducer, and $\Delta P_2$ is the pressure difference measured between the third pressure transducer and the fourth pressure transducer, and (h) computing the flow rate of fluid in the conduit in accordance with the formula of step (d), using the density $\rho$ computed in step (g).

3. A method for measuring fluid flow in a conduit having a gradual arc in which there is a pressure differential between two locations in the conduit, the method comprising the steps of:

(a) positioning a first pressure transducer in the side of the conduit at a first of the two locations, to measure pressure of fluid in the conduit;

(b) positioning a second or more pressure transducers at a second of the two locations, to carry out a plurality of pressure measurements of fluid in the conduit;

(c) a computer computing the average pressure from the plurality of pressure measurements, and (d) a computer computing flow rate of fluid in the conduit in accordance with the formula, $$mf = \left( \frac{\pi D}{4} \right)^{\frac{3}{2}} \sqrt{R\rho} \cdot \sqrt{\Delta P_1}$$

where mf is the mass flow in kilograms per second, R is the radius of curvature of the arc, D is the diameter of the conduit in meters, $\rho$ is the fluid density in kilograms per cubic meter, and $\Delta P$ is the pressure difference between the first pressure transducer and the average pressure calculation.

* * * * *